(12) United States Patent
Mellis et al.

(10) Patent No.: US 7,399,014 B2
(45) Date of Patent: Jul. 15, 2008

(54) BUMPER SYSTEM FOR A MOTOR VEHICLE

(75) Inventors: Jeffrey J. Mellis, Bloomfield Hills, MI (US); Gianfranco Gabbianelli, Troy, MI (US); Erryn L. Langlois, Windsor, CA (US); Mark A. Kessen, Macomb Township, MI (US)

(73) Assignee: Magna International Inc., Aurora, Ontario (CA)

( * ) Notice: Subject to any disclaimer, the term of this patent is extended or adjusted under 35 U.S.C. 154(b) by 139 days.

(21) Appl. No.: 11/171,732

(22) Filed: Jun. 30, 2005

(65) Prior Publication Data

US 2006/0001277 A1  Jan. 5, 2006

Related U.S. Application Data

(60) Provisional application No. 60/584,149, filed on Jul. 1, 2004.

(51) Int. Cl.
*B60R 19/02* (2006.01)
(52) U.S. Cl. ..................................... 293/120
(58) Field of Classification Search .............. 293/120, 293/121, 122, 109
See application file for complete search history.

(56) References Cited

U.S. PATENT DOCUMENTS

| | | | |
|---|---|---|---|
| 4,050,726 A | 9/1977 | Hablitzel | |
| 5,290,078 A | 3/1994 | Bayer et al. | |
| 6,349,521 B1 * | 2/2002 | McKeon et al. ............ | 52/735.1 |
| 6,406,081 B1 | 6/2002 | Mahfet et al. | |
| 6,575,510 B2 | 6/2003 | Weissenborn | |
| 6,609,740 B2 | 8/2003 | Evans | |
| 6,644,701 B2 | 11/2003 | Weissenborn et al. | |
| 6,663,150 B1 | 12/2003 | Evans | |
| 6,669,251 B2 | 12/2003 | Trappe | |
| 6,669,252 B2 | 12/2003 | Roussel et al. | |
| 6,672,635 B2 | 1/2004 | Weissenborn et al. | |
| 6,685,243 B1 | 2/2004 | Evans | |
| 6,726,261 B2 | 4/2004 | Goto et al. | |
| 6,726,262 B2 | 4/2004 | Marijnissen et al. | |
| 6,746,061 B1 | 6/2004 | Evans | |
| 6,908,127 B2 * | 6/2005 | Evans .......................... | 293/120 |
| 6,926,323 B2 * | 8/2005 | Evans .......................... | 293/120 |
| 7,073,831 B2 * | 7/2006 | Evans .......................... | 293/155 |
| 2003/0132640 A1 | 7/2003 | Weissenborn et al. | |
| 2003/0189343 A1 | 10/2003 | Evans et al. | |
| 2003/0189344 A1 | 10/2003 | Evans | |
| 2003/0227182 A1 | 12/2003 | Yoshida et al. | |
| 2003/0227183 A1 | 12/2003 | Weissenborn et al. | |

(Continued)

*Primary Examiner*—Dennis H. Pedder
*Assistant Examiner*—Melissa A Black
(74) *Attorney, Agent, or Firm*—Harness, Dickey & Pierce, P.L.C.

(57) ABSTRACT

A bumper system for mounting to a frame assembly of a motor vehicle at one end of the motor vehicle includes a bumper beam and an energy absorber. The bumper beam includes an upper beam wall, a lower beam wall, and a central beam wall between the upper and lower beam walls. The energy absorber is mounted to the bumper beam and includes an upper absorber wall, a lower absorber wall, and a central absorber wall between the upper and lower absorber walls. The energy absorber has a height that is greater than a height of the bumper beam such that the upper absorber wall is spaced upwardly above the upper beam wall and the lower absorber wall is spaced downwardly below the lower beam wall.

12 Claims, 5 Drawing Sheets

U.S. PATENT DOCUMENTS

2004/0021329 A1 2/2004 Evans
2004/0070220 A1 4/2004 Evans
2004/0084911 A1 5/2004 Weissenborn et al.
2004/0119301 A1 6/2004 Evans
2004/0145195 A1 7/2004 Mooijman et al.

* cited by examiner

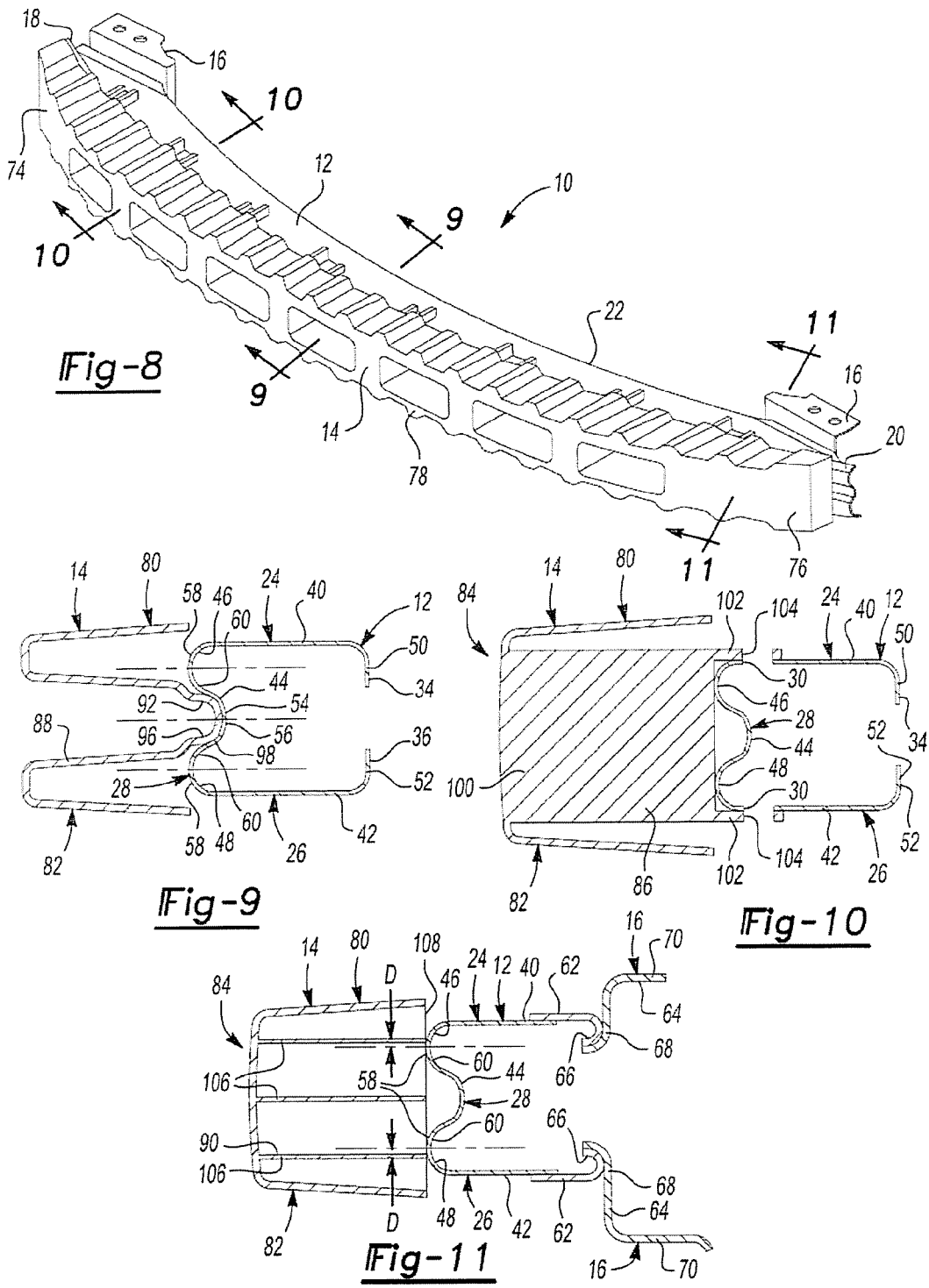

US 7,399,014 B2

BUMPER SYSTEM FOR A MOTOR VEHICLE

CROSS-REFERENCE TO RELATED APPLICATIONS

This application claims the benefit of U.S. Provisional Application No. 60/584,149, filed on Jul. 1, 2004. The disclosure of the above application is incorporated herein by reference.

FIELD OF THE INVENTION

The present invention relates to a bumper system for a motor vehicle.

BACKGROUND OF INVENTION

Conventional energy absorbing bumper systems generally include a beam and an energy absorber. The beam typically is steel, while the energy absorber is commonly EPP foam. Foam based energy absorbers typically have slow loading upon impact, which results in a high displacement. Further, foams are effective to a sixty or seventy percent compression, and beyond that point, foams become incompressible so that the impact energy is not fully absorbed. The remaining impact energy is absorbed through deformation of the beam and/or vehicle structure.

Some typical examples of prior art bumper systems are described in the following: U.S. 2003/0189343; U.S. Pat. No. 6,406,081; U.S. Pat. No. 6,575,510; U.S. Pat. No. 6,609,740; and U.S. Pat. No. 6,746,061.

There is a need in the automotive industry to produce a bumper system that provides strength adequate to conform to safety standards, lightweight to improve fuel efficiency and simple to manufacture and assemble.

SUMMARY OF THE INVENTION

One aspect of the invention relates to a bumper system for mounting to a frame assembly of a motor vehicle at one end of the motor vehicle, the bumper system comprising: a bumper beam including an upper beam wall, a lower beam wall, and a central beam wall between the upper and lower beam walls; and an energy absorber mounted to the bumper beam, the energy absorber including an upper absorber wall, a lower absorber wall, and a central absorber wall between the upper and lower absorber walls; wherein the energy absorber has a height that is greater than a height of the bumper beam such that the upper absorber wall has an unconnected, upper absorber wall free end that is spaced upwardly above the upper beam wall without contacting the upper beam wall such that an air gap extends the entire distance between the upper absorber wall free end and the upper beam wall, and the lower absorber wall has an unconnected, lower absorber wall free end that is spaced downwardly below the lower beam wall without contacting the lower beam wall such that an air gap extends the entire distance between the lower absorber wall free end and the lower beam wall.

Another aspect of the invention relates to a bumper system wherein each end portion includes a rib that is substantially straight in transverse cross-section relative to a longitudinal direction of the energy absorber, and each the rib has a first end attached to the intermediate portion and a second end abutting an outwardly facing convex surface of the bumper beam.

Still another aspect of the invention relates to a bumper system wherein each end portion of the energy absorber includes spaced apart ribs that directly abut the upper and lower outwardly facing convex surfaces of the bumper beam, and the intermediate portion of the energy absorber includes a protrusion that engages the bumper beam within the outwardly facing concave surface of the bumper beam.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings:

FIG. 8 is a front perspective view illustrating the bumper beam shown in FIG. 1;

FIG. 9 is a cross-sectional view through line 9-9 of FIG. 8;

FIG. 10 is a cross-sectional view through line 10-10 of FIG. 8;

FIG. 11 is a cross-sectional view through line 11-11 of FIG. 8;

DETAILED DESCRIPTION OF ILLUSTRATED EMBODIMENTS

Figure 1:
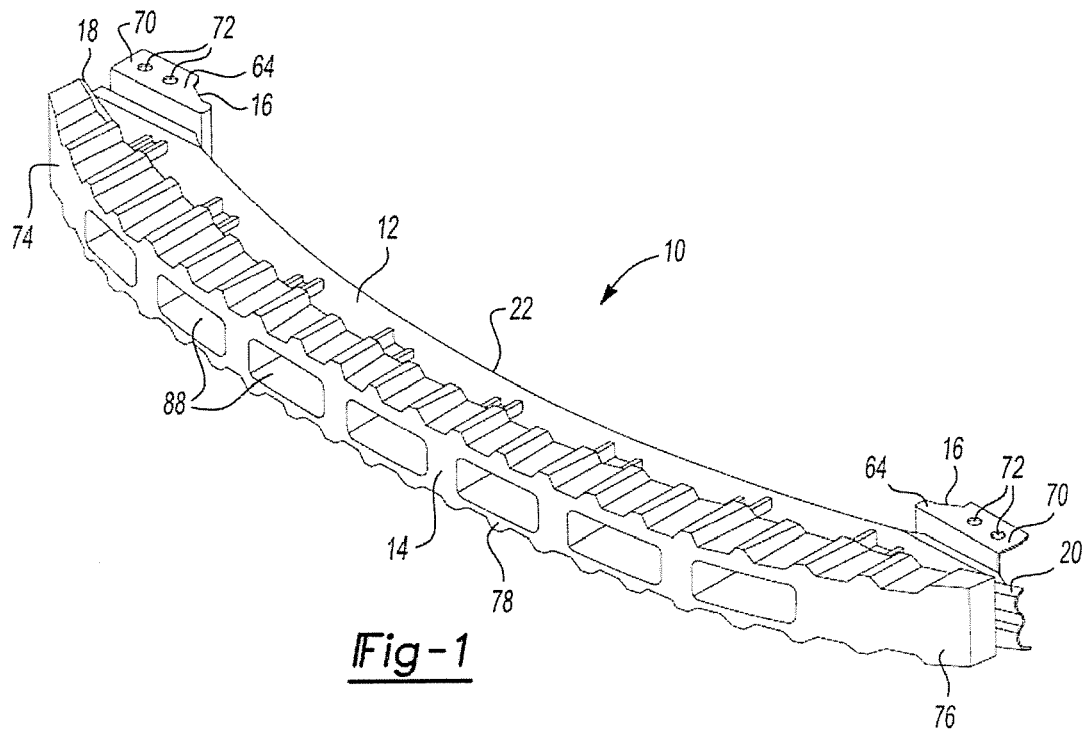
FIG. 1 is a front perspective view illustrating a bumper system constructed in accordance with an embodiment of the invention.
Figure 2:
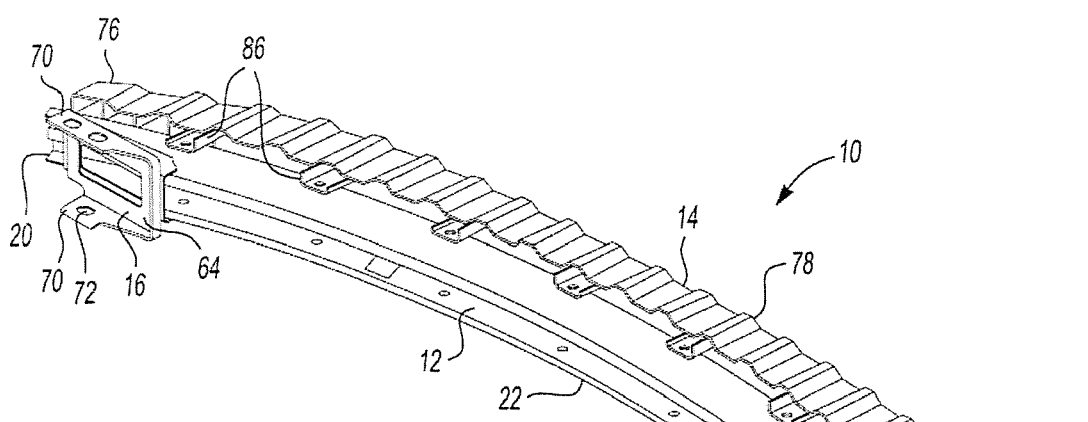
FIG. 2 is a rear perspective view illustrating the bumper system shown in FIG. 1.

FIGS. 1 and 2 illustrate a bumper system 10 for a motor vehicle constructed according to an embodiment of the present invention. The bumper system 10 is structured to be mounted to a frame assembly of the motor vehicle at either the front end or the rear end of the motor vehicle. The bumper system may be utilized on any suitable motor vehicle.

The main components of the bumper system of the present invention are a bumper beam 12, an energy absorber 14, and a pair of mounting brackets 16. The pair of mounting brackets 16 is rigidly mounted to the bumper beam 12 in spaced-apart relation on one side of the bumper beam 12. The energy absorber 14 is rigidly mounted on the other side of the bumper beam 12 and extends along the length of the bumper beam 12. The bumper system 10 is mounted to the frame assembly of the vehicle by rigidly mounting each mounting bracket 16 to the frame assembly. In use, the energy absorber 14 is positioned to receive collision forces during a front end or rear end collision. The energy absorber 14 collapses during the collision in order to dissipate energy and thus reduce the magnitude of collision forces being transmitted through the bumper beam 12, to the frame assembly of the vehicle. An example of a prior art bumper system is disclosed in U.S. Pat. No. 6,406,081 to Mahfet et al., which is incorporated herein by reference thereto.

The bumper system 10 is structured such that the height of the bumper beam 12 is significantly smaller than conventional bumper beams developed to meet IIHS and Federal Regulations. By using a much smaller bumper beam 12 in conjunction with the energy absorber 14, the weight of the bumper system 10 is significantly reduced with respect to conventional bumper systems. As will be further discussed below, the energy absorber 14 has a greater height than the bumper beam 12 to compensate for the reduced bumper beam height. Thus, the energy absorber 14 maintains adequate height of the bumper system 10 so that the bumper system 10 maintains equivalent performance with respect to conventional bumper systems.

Figure 3:
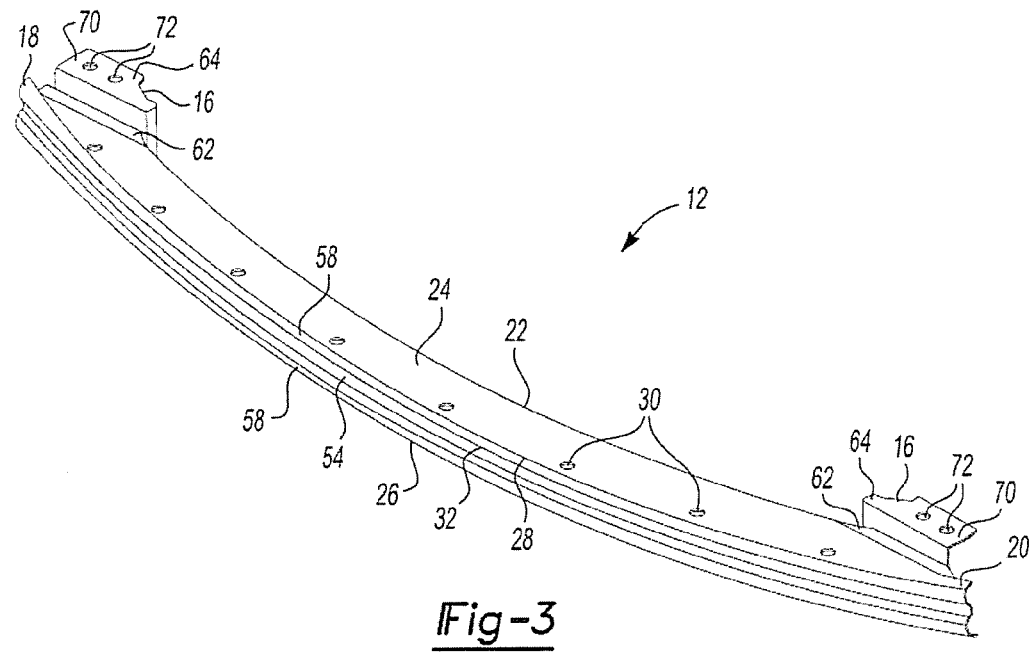
FIG. 3 is a front perspective view illustrating a bumper beam of the bumper system shown in FIG. 1.
Figure 4:
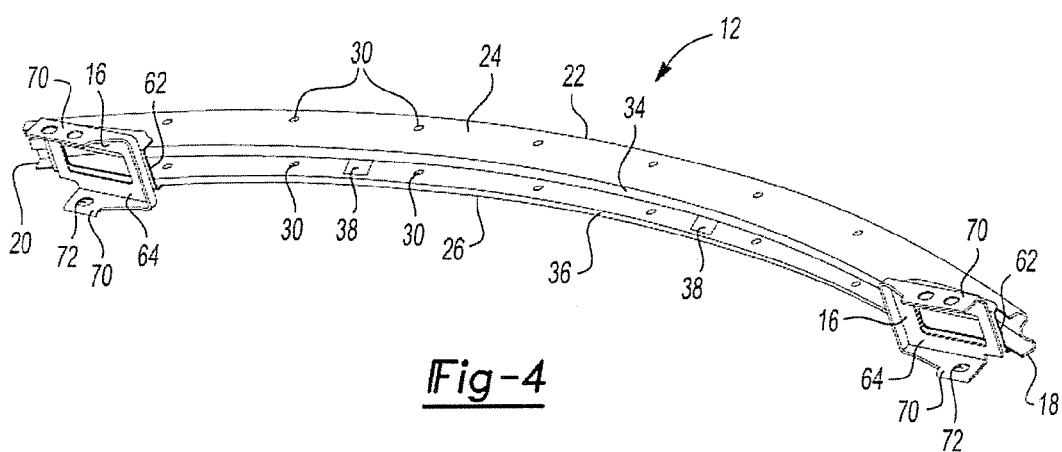
FIG. 4 is a rear perspective view illustrating the bumper beam shown in FIG. 3.

As shown in FIGS. 3 and 4, the bumper beam 12 is preferably formed from an elongated piece of sheet metal, e.g., high strength steel or ultra high strength steel. The sheet metal is bent to provide a one-piece bumper beam 12 with opposing end portions 18, 20 and a centrally disposed intermediate portion 22 extending between the end portions 18, 20. The sheet metal is also bent to impart a longitudinal curvature to the bumper beam 12. The sheet metal may be bent into the desired shape of the bumper beam 12 in any suitable manner, e.g., hot stamping, roll forming. Also, the bumper beam 12 may vary in length and longitudinal curvature to suit various vehicle widths and contours.

As shown in FIGS. 3, 4, and 9-11, the end portions 18, 20 and intermediate portion 22 of the bumper beam 12 define an upper wall 24, a lower wall 26, and a central wall 28 between the upper and lower walls 24, 26. The upper and lower walls 24, 26 are each formed to have a generally planar configuration. One or more openings 30 are provided in each of the upper and lower walls 24, 26 for mounting the bumper beam 12 to the energy absorber 14. The central wall 28 is formed to have a non-planar configuration with an elongated recessed portion 32 extending along the length of the bumper beam 12. Further, the free ends of the upper and lower walls 24, 26 of the intermediate portion 22 have inwardly extending flanges 34, 36 along the length thereof. Additionally, brackets and/or stiffening members 38 are attached between the upper and lower walls 24, 26, e.g., by welding, to add rigidity/reinforcement to the bumper beam 12. For example, FIGS. 2 and 4 show bracket/stiffening members 38 in the intermediate portion 22 of the bumper beam 12.

The bumper beam 12 is formed such that the end portions 18, 20 have similar transverse cross-sectional configurations. However, the end portions 18, 20 may have different configurations from one another. Also, the bumper beam 12 is formed such that the transverse cross-sectional configurations of the end portions 18, 22 are different than the transverse cross-sectional configuration of the intermediate portion 22. The end portions 18, 20 have different transverse cross-sectional configurations in order to mount the mounting brackets 16.

As shown in FIG. 9, each transverse cross-section of the intermediate portion 22 of the bumper beam 12 includes an upper horizontally extending wall section 40, a lower horizontally extending wall section 42, an arcuate central wall section 44, and connecting wall sections 46, 48 that interconnect ends of the upper and lower horizontally extending wall sections 40, 42 with respective ends of the arcuate central wall section 44. Also, flange sections 50, 52 extend inwardly towards one another from opposite ends of the upper and lower horizontally extending wall sections 40, 42.

FIG. 10 illustrates openings 30 in each of the upper and lower wall sections 40, 42 for mounting the bumper beam 12 to the energy absorber 14.

The arcuate central wall section 44 has a generally C-shaped configuration that provides an outwardly facing concave surface 54 and an inwardly facing convex surface 56. The arcuate central wall sections 44 define the elongated recessed portion 32 along the length of the intermediate portion 22.

The connecting wall sections 46, 48 each have a generally C-shaped configuration that provide an outwardly facing convex surface 58 and an inwardly facing concave surface 60. The outwardly facing surfaces 54, 58 that define the central wall 28 of the bumper beam 12 cooperate with the energy absorber 14 for impact management, as will be discussed below.

As shown in FIG. 11, the transverse cross-section of the end portions 18, 20 of the bumper beam 12 are substantially similar to the transverse cross-section of the intermediate portion 22. Accordingly, similar reference numerals have been utilized. In contrast, the end portions 18, 20 of the bumper beam 12 do not include flanges extending from the upper and lower horizontally extending wall sections 40, 42. Also, the upper and lower horizontally extending wall sections 40, 42 of the end portions 18, 20 are shorter than the upper and lower horizontally extending wall sections 40, 42 of the intermediate portion 22 (e.g., see comparison between FIGS. 9 and 11). The different cross-sectional configurations of the end portions 18, 20 are provided to mount the mounting brackets 16.

As shown in FIGS. 1-4 and 11, each mounting bracket 16 is in the form of a two-piece mounting bracket. Each two-piece mounting bracket 16 includes a beam engaging portion 62 and a frame engaging portion 64. As best shown in FIG. 11, the beam engaging portion 62 includes spaced apart curved flanges 66 that are rigidly secured, e.g., by welding, to spaced apart curved walls 68 of the frame engaging portion 64 in order to rigidly secure the two portions 62, 64 to one another.

In use, the beam engaging portion 62 of each mounting bracket 16 is rigidly secured, e.g., by welding, to upper and lower walls 24, 26 of a respective end portion 18, 20 of the bumper beam 12. The frame engaging portion 64 includes upper and lower flanges 70 with one or more openings 72 for mounting the frame engaging portion 64 to the frame assembly of the vehicle. For example, fasteners, such as bolts, may extend through respective openings 72 in the frame engaging portion 64 and through corresponding openings provided in the frame assembly of the vehicle to mount each mounting bracket 16 and hence the bumper system 10 to the vehicle in an operative position. However, the frame engaging portion 64 of each mounting bracket 16 may be secured to the vehicle in any other suitable manner, e.g., by welding. Moreover, the mounting brackets 16 may have any suitable structure to facilitate connection of the bumper system 10 to the vehicle.

Figure 5:
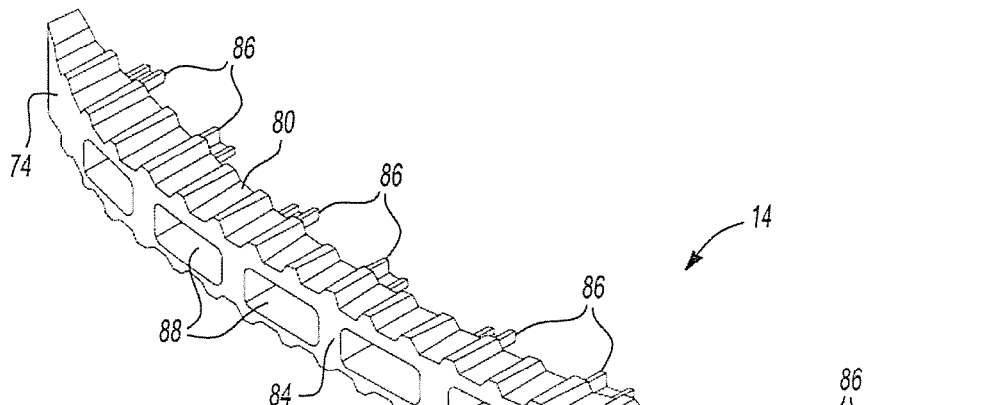
FIG. 5 is a front perspective view illustrating an energy absorber of the bumper system shown in FIG. 1.
Figure 6:
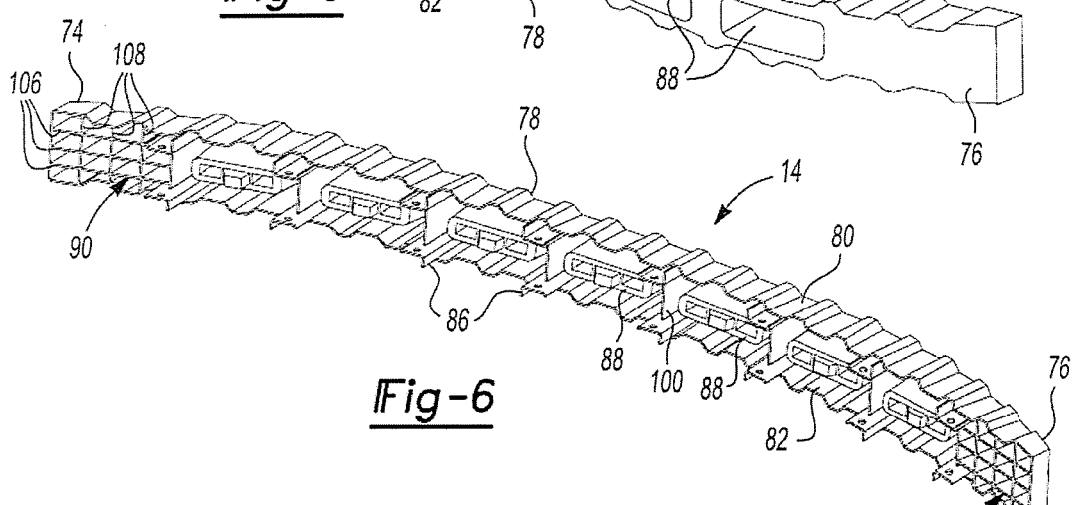
FIG. 6 is a rear perspective view illustrating the energy absorber shown in FIG. 5.
Figure 7:
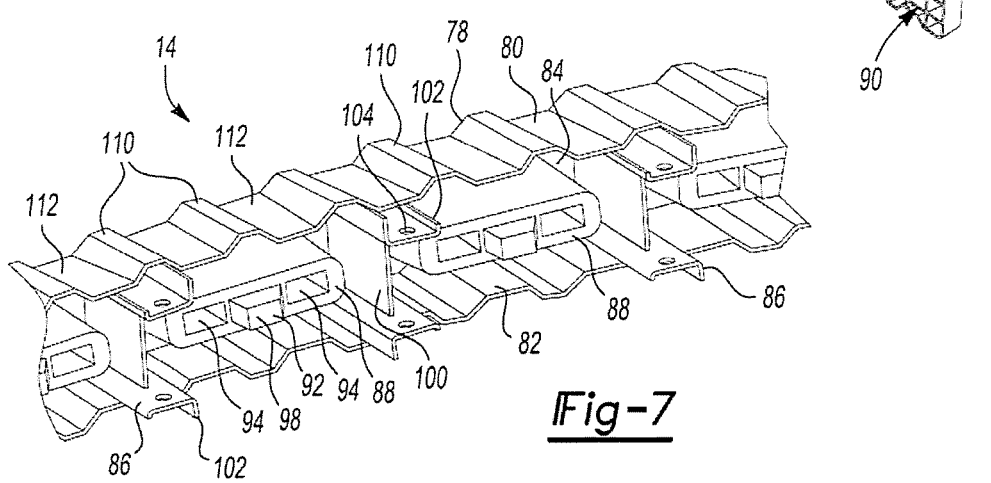
FIG. 7 is an enlarged rear perspective view illustrating a portion of the energy absorber shown in FIG. 5.

As shown in FIGS. 5-7, the energy absorber 14 is an integrally formed one-piece structure preferably formed by an injection molding process. The one-piece energy absorber 14 is formed with opposing end portions 74, 76 and a centrally disposed intermediate portion 78 extending between the end portions 74, 76. The energy absorber 14 is also formed with a longitudinal curvature that corresponds to the longitudinal curvature of the bumper beam 12.

As illustrated, the end portions 74, 76 and intermediate portion 78 of the energy absorber 14 cooperate to define an upper wall 80, a lower wall 82, and a central wall 84 between the upper and lower walls 80, 82. The upper and lower walls 80, 82 are each formed to have a non-planar generally "wavy"

configuration. A plurality of spaced apart mounting flanges 86 extend inwardly from the upper and lower walls 80, 82 of the intermediate portion 78 for mounting the energy absorber 14 to the bumper beam 12. The central wall 84 of the intermediate portion 78 is formed to have a non-planar configuration with a series of spaced apart recessed portions 88 along the length of intermediate portion 78. Further, the end portions 74, 76 each have a rib structure 90 that extends between the upper and lowers walls 80, 82 to add rigidity/reinforcement to the end portions 74, 76.

The energy absorber 14 is formed such that the end portions 74, 76 have similar transverse cross-sectional configurations. However, the end portions 74, 76 may have different configurations from one another. Also, the energy absorber 14 is formed such that the transverse cross-sectional configurations of the end portions 74, 76 are different than the transverse cross-sectional configuration of the intermediate portion 78. Further, the transverse cross-sectional configuration of the intermediate portion 78 varies along its length. The varying cross-sectional configuration of the energy absorber 14 is optimized to reduce the magnitude of collision forces being transmitted to the bumper beam 12 and the frame assembly of the vehicle.

FIG. 9 is a cross-section through one of the recessed portions 88 provided in the central wall 84 of the energy absorber 14. As illustrated, each recessed portion 88 includes a protrusion 92 and an opening 94 (see FIG. 7) on each side of the protrusion 92. The protrusion 92 has a generally C-shaped configuration that provides an outwardly facing concave surface 96 and an inwardly facing convex surface 98. The openings 94 reduce the weight of the energy absorber 14.

When the energy absorber 14 is mounted to the bumper beam 12, the protrusion 92 of each recessed portion 88 of the energy absorber 14 is received within the recessed portion 32 of the bumper beam 12. Thus the inwardly facing convex surface 98 of the protrusion 92 engages the outwardly facing concave surface 54 of the recessed portion 32. During a collision, a portion of the recessed portion 88 may deflect and/or buckle inward, towards the bumper beam 12. Curved portions of the central wall 28 that adjoin the outwardly facing concave surface 54 with the outwardly facing convex surfaces 46, 48 guide the recessed portion 88 towards a centerline disposed through the outwardly facing concave surface 54. In this manner, the energy absorber 14 transfers load to the intermediate portion 22 of the bumper beam 12 by transferring load from the protrusion 92 to the recessed portion 32.

FIG. 10 is a cross-section through one of the mounting flanges 86 provided on the intermediate portion 78 of the energy absorber 14. As illustrated, each mounting flange 86 includes a connecting wall 100 that extends inwardly from the central wall 84, and upper and lower flanges 102. An opening 104 is provided in each of the upper and lower flanges 102 for mounting the energy absorber 14 to the bumper beam 12. For example, fasteners, such as bolts, may extend through respective openings 104 in the flanges 102 and through the corresponding openings 30 provided in the upper and lower walls 24, 26 of the bumper beam 12 to mount the energy absorber 14 to the bumper beam 12 in an operative position. However, the flanges 102 of the energy absorber 14 may be secured to the bumper beam 12 in any other suitable manner, e.g., by welding. Moreover, the energy absorber 14 may have any suitable structure to facilitate connection to the bumper beam 12.

FIG. 11 is a cross-section through one of the end portions 74, 76 of the energy absorber 14 to illustrate the rib structure 90 that extends between the upper and lowers walls 80, 82. As illustrated, the rib structure 90 includes a plurality of horizontally extending ribs 106, e.g., three ribs that extend inwardly from the central wall 84. Also, as shown in FIG. 6, the rib structure 90 includes a plurality of vertically extending ribs 108, e.g., three ribs, that extend from the upper wall 80 to the lower wall 82 transversing each of the plurality of horizontally extending ribs 106. The ribs 106, 108 of the rib structure 90 form a grid-shape configuration that adds rigidity/reinforcement to the end portions 74, 76.

Moreover, when the energy absorber 14 is mounted to the bumper beam 12, one or more of the horizontally extending ribs 106 of the energy absorber 14 engage a connecting wall section 46, 48 of the bumper beam 12. As shown in FIG. 11, an upper one of the ribs 106 engages the connecting wall section 46 at a distance D from a laterally extending centerline of the connecting wall section 46, such that the upper one of the ribs 106 is disposed against the connecting wall section 46 between the laterally extending centerline thereof and the upper horizontally extending wall section 40. A lower one of the ribs 106 engages the connecting wall section 48 at a distance D from a laterally extending centerline of the connecting wall section 48, such that the lower one of the ribs 106 is disposed against the connecting wall section 48 between the centerline thereof and the lower horizontally extending wall section 42. Thus, the horizontally extending ribs 106 of the energy absorber 14 abut the outwardly facing convex surfaces 58 of the central wall 28 of the bumper beam 12 at distances D from the laterally extending centerlines of the outwardly facing convex surfaces 58.

During a collision, the horizontally extending ribs 106 may be forced against the outwardly facing convex surfaces 58. Since the upper and lower ribs 106 are disposed above and below laterally extending centerlines of the convex surfaces 58, respectively, the force between the convex surfaces 58 and the ribs 106 may cause the ribs 106 to be deflected and guided outward, around the convex surfaces towards the the upper and lower horizontally extending wall sections 40, 42, respectively. In this manner the energy absorber 14 absorbs some of the collision load in the ribs 106 and transfers some of the collision load to the end portions 18, 20 of the bumper beam 12 by transferring load from the horizontally extending ribs 106 to the connecting wall sections 46,48 of the bumper beam 12.

As shown in FIGS. 5-7, the upper and lower walls 80, 82 of the energy absorber 14 have a wavy configuration and are divergent with respect to each other. Also, upper and lower walls 80, 82 are generally straight in cross-section transverse to the longitudinal direction of said absorber 14 and are spaced from the beam 12 such that air gaps exist between the beam 12 and each of said upper and lower walls 80 and 82. Specifically, the upper and lower walls 80, 82 each have alternating protrusions 110 and recesses 112 that extend along the length of the energy absorber 14.

The energy absorber 14 is structured such that the energy absorber 14 has a greater height than the bumper beam 12. Thus, the upper wall 80 of the energy absorber 14 is spaced upwardly above the upper wall 24 of the bumper beam 12, and the lower wall 82 of the energy absorber 14 is spaced downwardly below the lower wall 26 of the bumper beam 12. The difference in height and spacing between the upper and lower walls 24, 26 of the bumper beam 12 and the upper and lower walls 80, 82 of the energy absorber 14 are clearly illustrated in FIGS. 9-11. As noted above, the height of the bumper beam 12 is significantly smaller than conventional bumper beams and the energy absorber 14 compensates for the reduced bumper beam height so that the bumper system 10 maintains equivalent performance with respect to conventional bumper systems.

Figure 12:
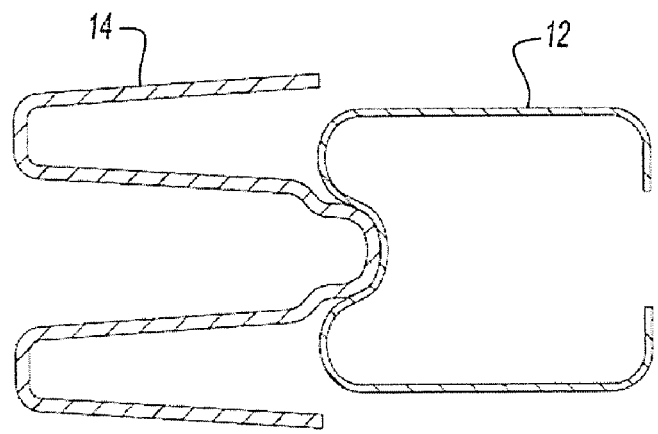
FIG. 12 is a cross-sectional view through line 9-9 of FIG. 8 with dimensions of an exemplary embodiment.
Figure 13:
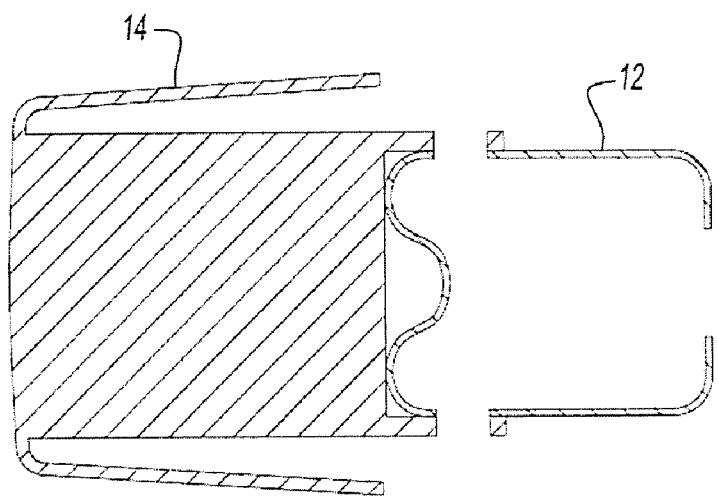
FIG. 13 is a cross-sectional view through line 10-10 of FIG. 8 with dimensions of an exemplary embodiment.
Figure 14:
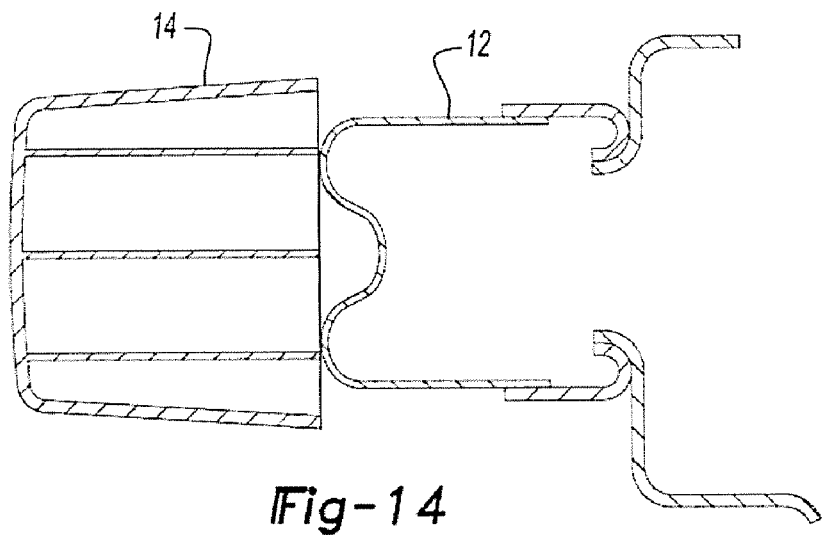
FIG. 14 is a cross-sectional view through line 11-11 of FIG. 8 with dimensions of an exemplary embodiment.

FIGS. 12-14 illustrate possible dimensions of the elements discussed with respect to FIGS. 9-11, respectively. It should be understood that the dimensions in FIGS. 12-14 are only one example of the dimensions and proportions of the various elements illustrated.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A bumper system for mounting to a frame assembly of a motor vehicle, said bumper system comprising:
    a bumper beam including an upper beam wall, a lower beam wall, and a central beam wall between said upper and lower beam walls; and
    an energy absorber having an upper absorber wall, a lower absorber wall, and a central absorber wall between said upper and lower absorber walls;
    wherein said central absorber wall is mounted to said central beam wall and said energy absorber has a height that is greater than a height of said bumper beam such that said upper absorber wall has an unconnected, upper absorber wall free end that is spaced upwardly above said upper beam wall, and said lower absorber wall has an unconnected, lower absorber wall free end that is spaced downwardly below said lower beam wall; and further wherein said central beam wall has spaced apart outwardly facing convex surfaces, each of said outwardly facing convex surfaces being defined at least partially by a laterally extending centerline, said energy absorber includes opposing end portions, wherein each of said end portions includes a rib, and each of said ribs has a first end attached to said central absorber wall and a second end abutting said bumper beam,
    wherein at least one of said ribs abuts at least one of said outwardly facing convex surfaces of said bumper beam, each of said ribs is spaced apart from said laterally extending centerlines of said outwardly facing convex surfaces, said outwardly facing convex surfaces guide said ribs around said outwardly facing convex surfaces when said energy absorber is forced against said bumper beam in response to an impact.

2. The bumper system according to claim 1, wherein said central beam wall has spaced apart outwardly facing convex surfaces; and said second end of each of said ribs abuts one of said outwardly facing convex surfaces.

3. The bumper system according to claim 2, wherein said energy absorber is integrally formed from a one-piece member.

4. The bumper system according to claim 3, wherein said bumper beam is integrally formed from a one-piece member.

5. The bumper system according to claim 1, wherein each of said ribs is substantially straight in transverse cross-section relative to a longitudinal direction of said energy absorber.

6. A bumper system for mounting to a frame assembly of a motor vehicle, said bumper system comprising:
    a bumper beam including an upper beam wall, a lower beam wall, and a central beam wall between said upper and lower beam walls; and
    an energy absorber having an upper absorber wall, a lower absorber wall, and a central absorber wall between said upper and lower absorber walls;
    wherein said central absorber wall is mounted to said central beam wall and said energy absorber has a height that is greater than a height of said bumper beam such that said upper absorber wall has an unconnected, upper absorber wall free end that is spaced upwardly above said upper beam wall, and said lower absorber wall has an unconnected, lower absorber wall free end that is spaced downwardly below said lower beam wall; and further wherein said central absorber wall of said energy absorber includes spaced apart protrusions having distal end surfaces engaging said bumper beam within a groove extending longitudinally of said central beam wall, said protrusions abutting an outwardly facing concave surface of said groove, the outwardly facing concave surface having a laterally extending centerline, a portion of said central beam wall guiding said central absorber wall towards said outwardly facing concave surface and the laterally extending centerline in response to an impact to thereby transfer load from said energy absorber to said bumper beam.

7. The bumper system according to claim 6, wherein said protrusions are spaced longitudinally apart from one another along the length of said energy absorber.

8. The bumper system according to claim 7, wherein said energy absorber is integrally formed from a one-piece member.

9. The bumper system according to claim 8, wherein said bumper beam is integrally formed from a one-piece member.

10. The bumper system according to claim 7, wherein said protrusion complementarily engages the central beam wall of said bumper beam.

11. The bumper system according to claim 6, wherein the system further comprises a pair of mounting brackets rigidly mounted to said bumper beam on one side thereof in a spaced-apart relation.

12. The bumper system according to claim 11, wherein said mounting brackets each comprises a beam engaging portion and a frame engaging portion.

\* \* \* \* \*